(12) United States Patent
El-Hennawey et al.

(10) Patent No.: US 7,110,417 B1
(45) Date of Patent: Sep. 19, 2006

(54) INSTANCE MEMORY HANDOFF IN MULTI-PROCESSOR SYSTEMS

(75) Inventors: Mohamed S. El-Hennawey, Belleville (CA); John C. Lynch, Belleville (CA); Marc Saunders, Belleville (CA)

(73) Assignee: Nortel Networks Limited, St. Laurent (CA)

( * ) Notice: Subject to any disclaimer, the term of this patent is extended or adjusted under 35 U.S.C. 154(b) by 766 days.

(21) Appl. No.: 09/739,714

(22) Filed: Dec. 20, 2000

Related U.S. Application Data

(63) Continuation-in-part of application No. 09/615,779, filed on Jul. 13, 2000, now abandoned.

(51) Int. Cl.
*H04J 3/16* (2006.01)
*H04J 3/17* (2006.01)
*G06F 9/46* (2006.01)

(52) U.S. Cl. .................. 370/437; 718/102; 370/465
(58) Field of Classification Search ........... 718/100, 718/102, 104; 370/230, 255, 257, 260, 437, 370/462, 465
See application file for complete search history.

(56) References Cited

U.S. PATENT DOCUMENTS

| | | | | |
|---|---|---|---|---|
| 4,709,344 A | * | 11/1987 | Crawford | 708/312 |
| 5,526,363 A | * | 6/1996 | Weiss et al. | 370/477 |
| 5,841,763 A | * | 11/1998 | Leondires et al. | 370/260 |
| 6,038,400 A | * | 3/2000 | Bell et al. | 710/11 |
| 6,104,721 A | * | 8/2000 | Hsu | 370/431 |
| 6,108,343 A | * | 8/2000 | Cruickshank et al. | 370/437 |
| 6,401,176 B1 | * | 6/2002 | Fadavi-Ardekani et al. | 711/151 |
| 6,526,068 B1 | * | 2/2003 | Smith | 370/474 |
| 6,606,306 B1 | * | 8/2003 | Lin et al. | 370/261 |

\* cited by examiner

*Primary Examiner*—Lewis A. Bullock, Jr.
(74) *Attorney, Agent, or Firm*—Withrow & Terranova, PLLC

(57) ABSTRACT

A given DSP, when processing signals of a channel, stores channel instance data in a multiplexed memory in association with itself. If the channel processing task changes to one for which the given DSP is not optimised, the given DSP moves the channel to an appropriate new DSP. Additionally, the given DSP transfers the association of the channel instance data to an association with the new DSP. In this way, the new DSP is provided with the channel instance data without the requirement for physically transferring such data.

14 Claims, 3 Drawing Sheets

INSTANCE MEMORY HANDOFF IN MULTI-PROCESSOR SYSTEMS

CROSS-REFERENCE TO RELATED APPLICATION

This is a continuation-in-part application of application Ser. No. 09/615,779 filed Jul. 13, 2000, now abandoned, entitled DIGITAL SIGNAL PROCESSING APPARATUS HAVING MULTIPLE DIGITAL SIGNAL PROCESSING CORES AND RELATED METHOD, the contents of which are incorporated by reference herein.

BACKGROUND OF THE INVENTION

This invention relates to a method and system for processing digital communication channels.

Digital channels in a communications system are typically processed for a number of purposes. For example, a voice channel in a digital communications system may require processing for echo canceling, dual tone multi-frequency (DTMF) decoding, and audio decoding. Digital signal processors (DSPs) are used to accomplish such processing. A DSP may store software algorithms enabling it to perform one or more channel processing tasks. This optimises the DSP to perform these channel processing tasks. (The term "optimise" is a common spelling variant of the term "optimize" with identical meaning.) Further, a DSP may be able to simultaneously handle processing for several channels. To cope with an ever increasing number of processing tasks and an ever increasing number of channels to be processed, many DSP chips now include multiple DSP processing centers, known in the art as DSP cores, coordinated by a host processor.

While a DSP is processing a channel, the required channel processing task for the channel may change. By way of example, a DSP may be decoding an audio channel which had been compressed (i.e., encoded) to 64 kB/s in accordance with ITU recommendation G.711. However, while doing so, it may be that the bit rate of the channel drops to 16 kB/s in view of the level of compression dropping to that according to ITU recommendation G.728. Such a change could occur in response to a drop in the quality of service for the channel. Given a change in the processing requirements for a channel, in some instances the DSP may be able to dynamically switch to new software to handle the new processing task. For example, in U.S. Pat. No. 6,108,343 to Cruickshank et al. program code for several tasks may have been downloaded from slow memory to the DSP program memory. In such case, if the channel processing task changes to another task for which the DSP memory has the necessary program code, the DSP may quickly switch to the new software. However, the limited capacity of the DSP memory restricts the number of programs which may be held therein. Thus, there will be situations where a DSP cannot be readily provisioned for the new channel processing task.

Therefore, there remains a need for a system which can effectively respond to changes in the processing task for a channel.

SUMMARY OF INVENTION

A given DSP, when processing signals of a channel, stores channel instance data in a multiplexed memory in association with itself. If the channel processing task changes to one for which the given DSP is not optimised, the channel is moved to an appropriate new DSP. Additionally, the association of the channel instance data is transferred to an association with the new DSP. In this way, the new DSP is provided with the channel instance data without the requirement for physically transferring such data.

Accordingly, the present invention comprises a method of processing communication channels, comprising: for each of a plurality of channels: undertaking a given channel processing task for a given channel with one processor of a plurality of processors, said one processor optimised for said given channel processing task; storing instance data for said given channel processing task in a memory which may be associated with any one of said plurality of processors such that said instance data is associated with said one processor; when said given channel processing task for said given channel changes to a new channel processing task for which said one processor is not optimised, moving processing of said given channel to a different one of said plurality of processors, said different one of said processors being optimised for said new channel processing task, and changing association of said stored given channel instance data to an association with said different processor.

According to another aspect of the present invention, there is provided a multiprocessor system for processing communication channels, comprising: a plurality of processors, each optimised for at least one channel processing task and each having processor memory for storing information associating different channel processing tasks to different ones of said plurality of processors; a multiplexed memory for storing channel processing instance data for each of said plurality of processors; an associator for associating channel processing instance data for each channel with one of said plurality of processors; each processor of said plurality of processors operable to, on a channel processing task for a channel currently being processed by said each processor changing to a new task, arrange for said associator to associate instance data for said channel with a processor optimised to said new task.

BRIEF DESCRIPTION OF THE DRAWINGS

In the figures which illustrate an example embodiment of the invention.

DETAILED DESCRIPTION

Figure 1:
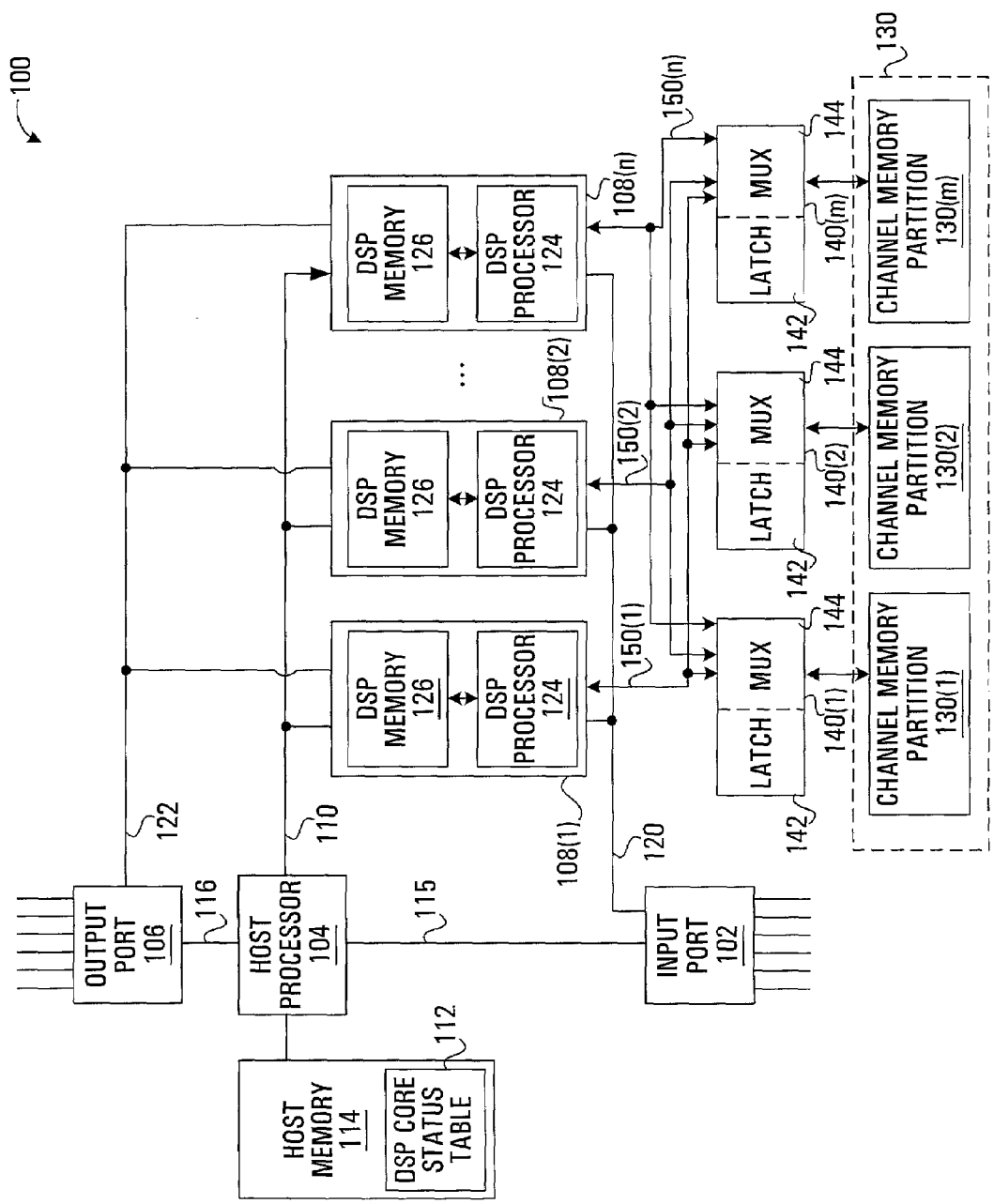
FIG. 1 is a schematic diagram of a system made in accordance with this invention.

Turning to FIG. 1, a DSP system 100 is adapted to receive many channels at an input port 102, process data streams representing the received signals associated with those channels (hereinafter "signals to be processed"), and then output data streams representing the digitally processed signals (the "processed signals") to an output port 106.

As will be appreciated by those of ordinary skill in the art, signals received by DSP system 100 may be in the form of demultiplexed bit streams which had been previously multiplexed using, for example, Time Division Multiplexing (TDM) to combine data streams corresponding to signals from a plurality of channels. However, if desired, in an embodiment of the present invention, a single, multiplexed data stream could be received by DSP system 100 which also performs any necessary demultiplexing prior to digital signal processing. Additionally, or alternatively, DSP system 100 may, through operation of a conventional multiplexor, output a single, multiplexed bit stream.

Note that signals to be processed may arrive at input port 102 from a source network such as a TDM network, packet network, etc. Similarly, the processed signals at output port 106 can be routed to any destination network.

Interposed between input port 102 and output port 106 are host 104 and multiple DSP cores 108(1), 108(2), ..., 108(n) (collectively and individually DSP core 108). A control signal bus 115 connects the input port 102 to the host and another control signal bus 116 connects the host to the output port 106. Each DSP core 108 is connected to the input port 102 via a multiplex databus 120 and to the output port 106 via a multiplex data bus 122. Typically multiplex databuses 120, 122 are serial buses and the DSP cores 108 and the ports 102, 106 are programmed to transmit and receive according to a well understood protocol (such as ethernet packet bus, utopia packet bus, or circuit switched bus). The host is electrically interconnected to the multiple DSP cores 108(1), 108(2), ..., 108(n) via a local inter-processor communication bus 110 (which is typically a parallel bus); the cores are also connected to each other via bus 110. Bus 110 is used for transmitting control signals between DSP cores 108 and host 104. In some embodiments, each DSP core 108 may also directly communicate with each other by communication bus 110, enabling communication between any selected two DSP cores 108.

Also forming part of DSP system 100 is host memory 114. Host memory 114 is used to store data used by host 104 to provide for the administration of DSP cores 108; algorithms used to process received signals; and software instructions executed by host 104 adapting DSP system 100 to provide the functions described herein. Part of the data stored in memory 114 forms DSP core status table 112. DSP core status table 112 stores information relating to the capabilities of each DSP core 108, the channels it is processing, and other status information. The information stored with table 112 is described in greater detail below.

Host 104 may be a DSP controller that allocates the processing resources of DSP cores 108 by assigning incoming signals associated with a channel to one or more of the DSP cores 108 for processing. As will become apparent, host 104 is used to assign channels to DSP cores 108 and assess the status of the cores and channels. In some embodiments, host 104 may execute some network applications and perform some supervisory operations, such as establishing call set-up in a voice over packet network.

DSP system 100 may be an application specific integrated circuit (ASIC) or a conventional DSP core or chip in combination with an ASIC(s) such that the functions herein are provided. In a further alternative, a general purpose processor such as, for example, a Reduced Instruction Set Computer (RISC) chip, could also be used and adapted to provide the functionality described herein.

Each DSP core 108 could be formed using a single DSP chip having a single DSP core. Alternatively, several DSP cores 108 could be formed in a single DSP chip. Example DSP chips that contains one (or more) DSP core(s) are the Texas Instruments TMS 320C54X family and Motorola's 56300 DSP chip. Each DSP core 108 includes a conventional processor 124 in communication with DSP memory 126. DSP memory 126 is adapted to store one or more DSP algorithms (i.e., program code) to accomplish a channel processing task (e.g., a speech coding or decoding algorithm; a fax relay algorithm, etc.) and also provides a scratch memory. Dependent upon the computational processing required for a given task, DSP processor 124 may be able to process more than one channel concurrently using the algorithm for the given task. As is known, to enhance efficiency, the processor 124 may process each of several channels using the same program code (i.e., the processor may use program re-entrancy) rather than making a copy of the code for each channel processed. Although it is preferred that processor 124 process the signals of each channel using the same algorithm, it is contemplated that in some circumstances, processor 124 may process signals associated with two or more channels concurrently using different algorithms in order to accomplish different tasks.

If a task for channels processed by processor 124 changes from one that is computationally intensive to one that is less so but which is supported by the processor, it may be that the processor 124 is able to handle processing of a greater number of channels concurrently. Accordingly, the number of channels processed by a selected DSP core 108 may be dynamic (i.e., it may vary over time depending upon the task being performed by the core 108).

DSP system 100 also has a multiplexed channel memory 130 with a partition 130(1), 130(2), ... 130(m) for each channel which may be processed by the DSP system. Associated with each channel memory partition is a channel memory associator 140(1), 140(2), ... 140(m). Each channel memory associator comprises a latch 142 and a bi-directional multiplexer 144. Each DSP core 108 has a bus 150(1), 150(2), ... 150(n) providing an interconnection between the DSP core and each of the channel memory associators.

To configure DSP system 100 for operation, at any time after power-up, the host 104 may receive commands via input port 102 prompting it to download specified channel processing task software from memory 114 to the memory 126 of DSP cores 108. In this way, the DSP cores may be optimised for the handling of specific channel processing tasks. Some DSP cores may be left unprovisioned, for reasons which will become apparent.

Figure 2:
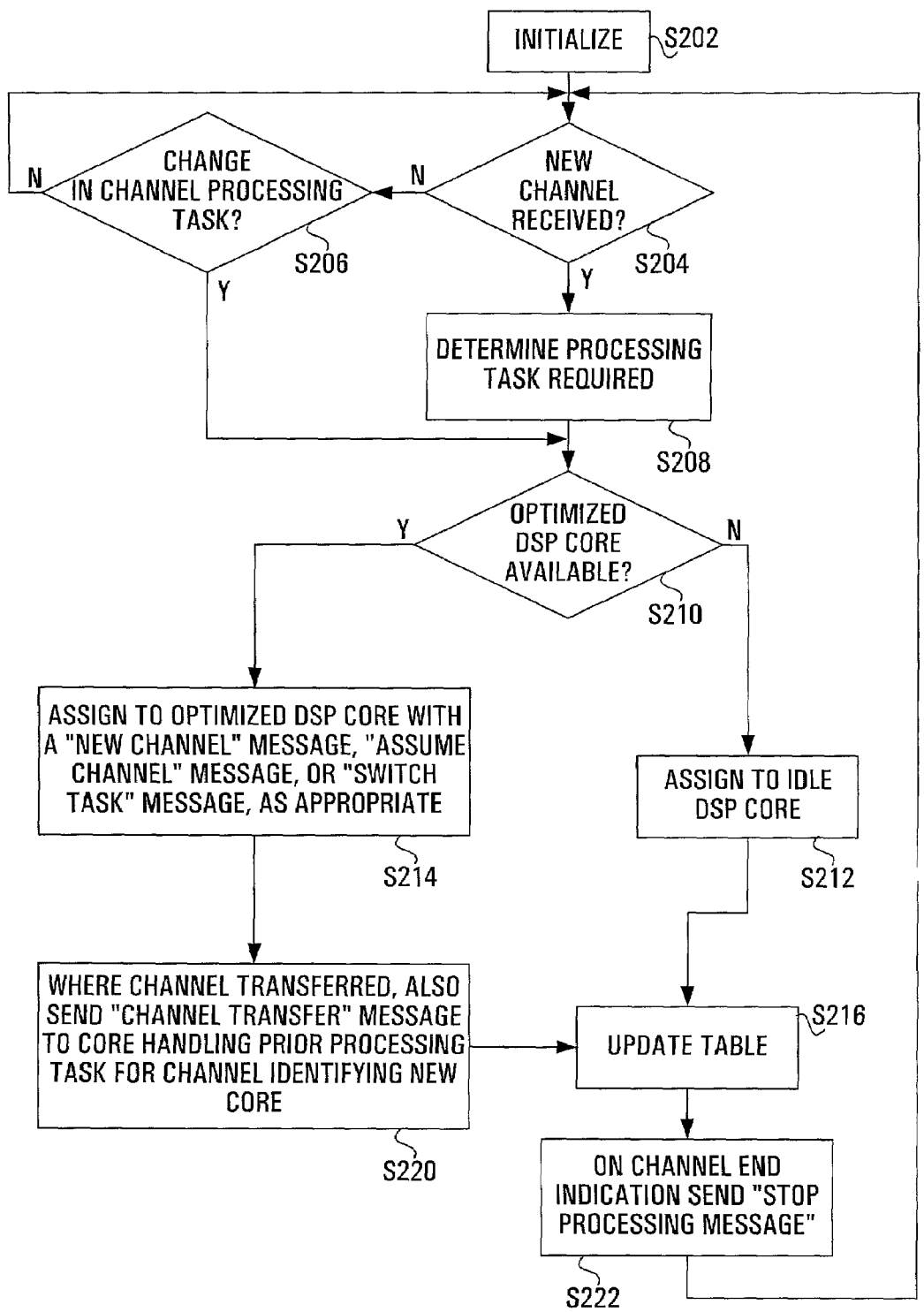
FIG. 2 is a flow diagram illustrating the operation of the host of FIG. 1.

With reference to FIG. 2 along with FIG. 1, in operation, DSP system 100 is initialized at power up (S202) and all DSP cores 108 are assumed to be free or idle (i.e., not providing any signal processing). As a result, host 104 clears all latches 142 (by issuing a command on bus 110 to each DSP core 108) and initializes the information stored in table 112. Table 112 stores information indicating the status of each DSP core. This status information includes the following: the number of DSP cores within DSP system 100; those DSP cores 108 which are available (i.e., functioning properly); the channel(s) currently being processed by each DSP core 108; the channel processing task(s) (algorithm(s)) which may be provided by each DSP core 108; and the remaining capacity at each DSP core 108 to take up additional channels for processing.

If signals corresponding to a new channel are received by DSP system 100 (via control signal bus 115 from input port 102) (S204), host 104 will determine what channel processing task is required (S208). Then, host 104 will determine by reference to table 112 if there are any DSP cores 108 which provide the task determined and can accommodate the new channel (S210). If no (i.e., a DSP core 108 providing the required task which has available capacity cannot be identified), a new channel (and its associated signals) received by DSP system 100 will be assigned to an idle DSP core 108 and the necessary algorithm will be downloaded by the host from host memory 114 to DSP core memory 126 (S212).

If, however, a DSP core 108 is identified that provides the algorithm required and also has available capacity, host 104 will assign the new channel to the identified DSP core 108 (S214). A channel assignment is accomplished by the host sending a "new channel" message to the selected core over bus 110 indicating the location of the channel and, optionally, a destination address for processed signals. The identified DSP core 108 having been assigned a new channel will then perform operations described hereinafter in conjunction with FIG. 3. Once the host has assigned the new channel, it updates table 112 as appropriate (S216). When the host receives on indication on control signal bus 115 that a channel has been torn down, it sends a "stop processing" message to the DSP core 108 which had been processing the channel (S222).

Figure 3:
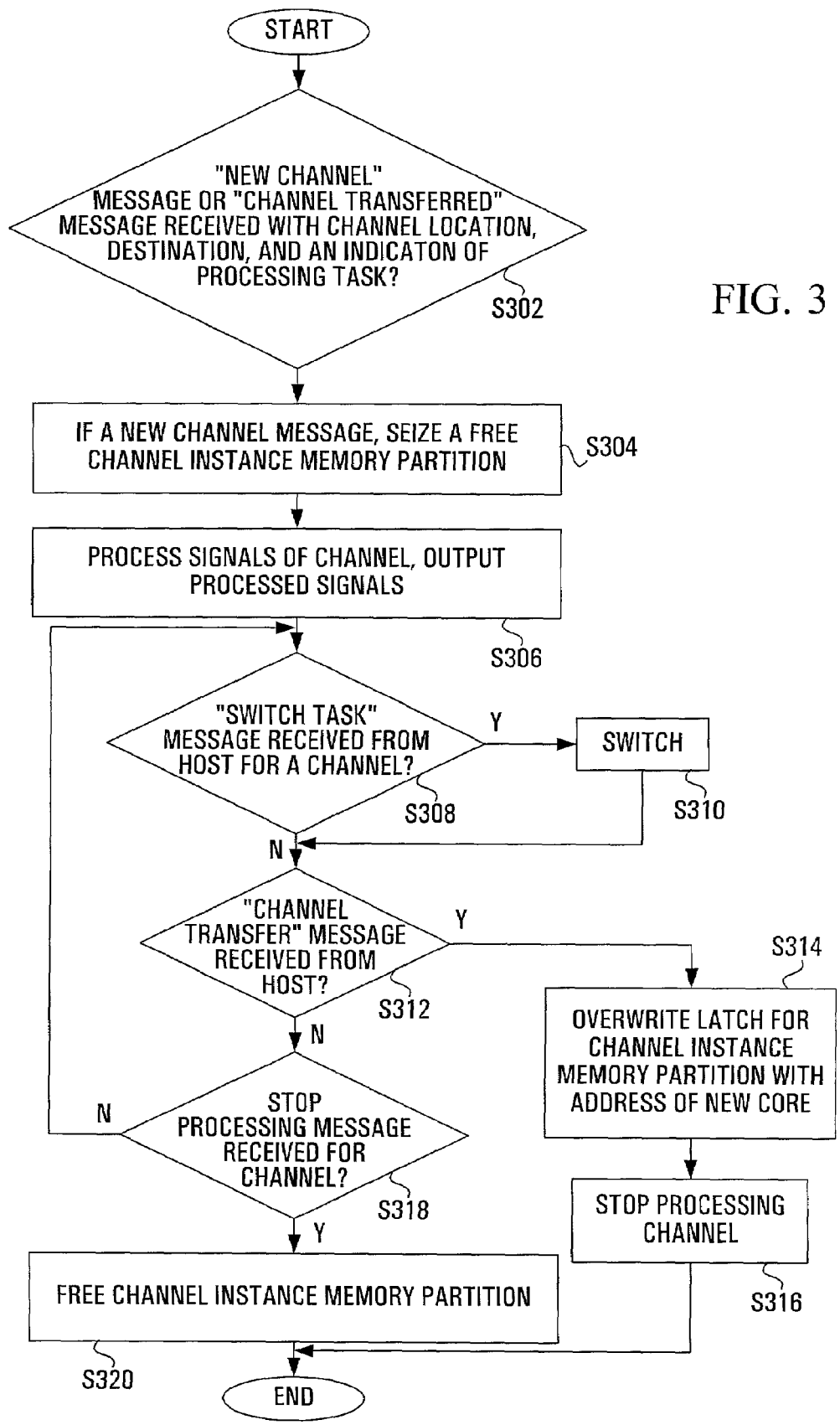
FIG. 3 is a flow diagram illustrating the operation of a DSP core of the system of FIG. 1.

Turning to FIG. 3, a DSP core 108 may receive a "new channel" message from the host (S302). This message will identify the location of the new channel (i.e., the timeslot in which signals for the channel are found on bus 120). Additionally, the message will include an identifier of the algorithm to apply to the channel. If the algorithm program code is not in the memory of the core, the host will download the code from host memory 114. Typically, code for the required algorithm will need to be retrieved from memory 114 when the DSP core 108 switches from idle to active mode. Additionally, the message may include a destination for the processed channel signals (which is typically the output port but may instead be another DSP core for additional processing).

In response to a "new channel" message from the host, the DSP processor of the core 108 will seize a partition of channel instance memory 130 by overwriting a free latch 142 with the address of the DSP processor (S304). DSP processor 124, executing the code in memory 126 corresponding to the algorithm required, will then process signals (in a conventional manner by DSP core 108) associated with the assigned channel by reference to the location of the channel signals provided by the host 104 (S306). In effect, this means the DSP core will look to a particular time slot of bus 120 at which the channel signals are found. Processed signal data associated with the channel will then be output from DSP core 108. Typically, the processed signals are sent directly to output port 106 from the DSP core via bus 122.

While processing a channel, the DSP core 108 will develop and use channel instance data. Channel instance data comprises information about the channel and certain historical and predicted information. This channel information includes the address of the next destination for the samples (namely the output port or another DSP core). For example, based on channel instance information for a channel tied to an echo cancelling DSP core, the echo cancelling DSP core may send echo cancelled samples of the channel directly to an audio decoding DSP core. The channel instance data may also include voice jitter information which is stored in an elastic buffer and used to compensate for perturbations in the speed at which samples are received in order that the output of the DSP core is smoothed. Further, a sliding window of recently received channel data samples may be stored in a history buffer. A history buffer is necessary where a DSP core decodes audio due to the use by the DSP core of adaptive filters. The channel instance data may also include an indicator of the current processing task.

The DSP core stores the channel instance data by placing the data on its bus 150 with its address. Thus, for example, DSP core 108(1) may seize latch 142 of module 140(2) in conjunction with processing a particular channel. Whenever core 108(1) has channel instance data in respect of the particular channel, it will place such data on its bus 150(1) together with its address and a write request to a virtual address. Latch 142 for module 140(2), being written with the address of core 108(1), permits the channel instance data on bus 150(1) to be received by multiplexer 144 of module 140(2). The multiplexer then stores the channel instance data in partition 130(2) of channel memory 130 at the virtual address. In a similar manner, core 108(1) may retrieve data from partition 130(2) of the channel memory with an appropriate read request.

Upon receipt of indication from host 104 to cease processing signals associated with a particular channel (S318), a DSP core 108 will cease processing signals associated with the identified channel and overwrite the latch for the channel instance memory partition with an address indicating the partition is free (S320).

It may be that, during processing of a channel, the processing requirements for the channel change. The host 104 will be apprised of this consequent upon control information appearing on the control signal bus 115 (S206). In such case, the host will reference the DSP core status table 112 to determine if the current DSP processing the channel is provisioned to handle the new processing task (S210). If yes, the host sends a "switch task" message to the DSP core (S214). In response (S308), the DSP core switches to the required new algorithm which it will have in its memory 126 (S310). If, however, the current DSP is not optimised for the new channel processing task (by virtue of having the new task stored in its memory 126), the host will reference table 112 for a core which is optimised for the new task and has capacity to assume another channel. On finding such a core (S210), the host sends an "assume channel" message to the new (assignee) core (S214). This message identifies the location of the assumed channel, the destination for processed samples, and the required task. In response to receiving this message (S302), the assignee core immediately begins processing the assumed channel (S306). This means that the assignee core will begin sending read and write requests to channel memory 130 on its bus 150 identifying itself by its address. For this to work, the latch for the memory partition of channel memory 130 which holds the instance data for the channel must be overwritten with the address of the assignee DSP core. This is accomplished by the host sending a "channel transfer" message to the core which was previously handling the processing of the channel identifying the new core handling processing of the channel (S220). The "channel transfer" message causes the previous (assignor) core to overwrite the latch for the channel instance memory partition it had seized for the channel with the address of the assignee core (S314) and then to cease processing of that channel (S316).

The assignee DSP core at the receiving end of an "assume channel" message follows the procedure described hereinbefore commencing with S302 just as it does when receiving a "new channel" message from the host. However, when a channel is transferred from another DSP core, the assignee core does not seize a new partition of channel memory since the assignor core has already provided the channel memory partition. Further, the channel memory partition handed off to the assignee core has the existing channel instance data for the channel. In this way, therefore, a channel can be quickly and efficiently transferred to a different core 108 in order to handle a new task.

It will be apparent from the foregoing that if a DSP core is processing several channels, it will have a channel memory partition for storing the channel instance information for each of these channels.

Channel memory 130 is multiplexed because each DSP core 108 is connected to each partition of the memory (via the memory associators 140). Because the channel memory is multiplexed, channel instance data may be handed off to any required DSP core. As will be appreciated by those skilled in the art, the illustrated multiplexed memory scheme is only one of a number of possible multiplexed memory architectures. For example, a direct memory access (DMA) engine could be used in association with common memory to hand off channel instance memory. Additionally, channel instance data for each channel could be stored in one buffer of a shared buffer pool and the given buffer allocated to an appropriate DSP core with a buffer manager. A buffer could consist of a linked list of memory blocks. Instance data would then be built up by associating a collection of memory blocks into a single list. The linked list could be generated, enlarged, trimmed, or released by the memory controller as required in order to satisfy the demands of the DSP core 108.

In the described embodiment, a change in a channel processing task is signalled to the host on control signal bus 115. In certain communications systems, a change in the channel processing task will be signalled via the data arriving for the channel. In such case, it may be easier for the DSP core to be provisioned to detect the change in the channel processing task. The core could then simply notify the host and the procedure would continue as described hereinbefore. Alternatively, on detecting a processing change for a channel, the DSP core could be provisioned to determine whether it could handle the new task and, if not, query the host for an appropriate assignee core. On learning of the assignee core, the current, assignor, core for the channel could initiate an overwrite of the latch for the channel memory partition holding instance data for the channel with the address of the assignee core in order to hand off the channel instance memory to the assignee core. Additionally, the assignor core could itself send an "assume channel" message to the assignee core over bus 110 resulting in the assignee core commencing processing of the channel.

In place of a system 100 comprising a single chip having DSP cores and a host, the system may comprise DSPs implemented on separate chips, co-ordinated by a host implemented on another chip. Further, as will be appreciated by those of ordinary skill in the art, the functions described herein may be implemented using hardware, software or a combination of the two. Computer instructions including, for example, sub-routines corresponding to the operations illustrated in FIGS. 2, and 3, DSP algorithm routines, ASIC design data and the like may be provided for on diskette, memory chip, or other removable or non-removable computer readable medium. Furthermore, the computer readable media may be a media remote from DSP system 100 the instructions of which can be downloaded over a suitable link such as over a network, dedicated data link, or the like.

While one (or more) embodiment(s) of this invention has been illustrated in the accompanying drawings and described above, it will be evident to those skilled in the art that changes and modifications may be made without departing from the invention. All such modifications or variations are believed to be within the scope of the invention as defined by the claims appended hereto.

What is claimed is:

1. A method of processing communication channels, comprising:
   for each of a plurality of channels:
      undertaking a given channel processing task for a given channel carrying at least one signal with one processor of a plurality of processors, said one processor optimized for said given channel processing task;
      storing instance data for said given channel processing task in a memory which may be associated with any one of said plurality of processors such that said instance data is associated with said one processor, when said given channel processing task for said given channel dynamically changes to a new channel processing task for which said one processor is not optimized,
      moving processing of said given channel to a different one of said plurality of processors, said different one of said plurality of processors being optimized for said new channel processing task, and
      changing association of said stored given channel instance data to an association with said different one of said plurality of processors, such that processing for said at least one signal in said given channel is dynamically shifted to said different one of said plurality of processors.

2. The method of claim 1 wherein said stored given channel instance data comprises a history buffer storing historical data samples for a signal on said given channel.

3. The method of claim 1 wherein said stored given channel instance data comprises a jitter buffer.

4. The method of claim 1 wherein said moving comprises consulting a table for a processor optimized to said new channel processing task.

5. The method of claim 1 wherein said memory is a multiplexed memory.

6. The method of claim 5 wherein said changing association comprises overwriting a latch holding an address of said one processor with an address of said different one of said plurality of processors.

7. The method of claim 1 further comprising, wherein said one processor is optimized for said new channel processing task, undertaking said new channel processing task for said given channel at said one processor.

8. The method of claim 7 further comprising keeping a table with an identification of available ones of said plurality of processors and an identification of processing tasks handled by said available ones of said plurality of processors.

9. A method of processing communication channels comprising:
   at each of a plurality of processors:
      undertaking a channel processing task using a multiplexed memory having a plurality of channel memory partitions, each of the plurality of channel memory partition for storing channel instance data for a given channel carrying at least one signal;
   when said channel processing task changes to a new channel processing task:
      referencing a table to identify a new task optimized processor of said plurality of processors optimized to said new channel processing task,
      prompting said new task optimized processor to assume processing of said given channel, and
      arranging for an associator to associate the channel instance data stored in one of said plurality of channel memory partitions and associated with said given channel with said new task optimized processor, such that processing for said at least one signal in said given channel is dynamically shifted from one task optimized processors to said new task optimized processors.

10. A multiprocessor system for processing communication channels, comprising:
   a plurality of processors, each optimized for at least one channel processing task and each having processor memory for storing information associating different channel processing tasks to different ones of said plurality of processors;

a multiplexed memory for storing channel processing instance data for each of said plurality of processors;

an associator for associating channel processing instance data for each channel with one of said plurality of processors;

each processor of said plurality of processors operable to, on a channel processing task for a channel carrying at least one signal and currently being processed by said each processor changing to a new task, arrange for said associator to associate instance data for said channel with a processor optimized to said new task, such that processing for the at least one signal in said channel is dynamically shifted from one processor to said processor optimized to said new task.

11. The system of claim 10 further comprising a host for, on a channel processing task for a channel currently being processed by a given processor changing to a new task, sending to said given processor an indication of said processor optimized to said new task.

12. The system of claim 10 wherein said associator comprises a latch for channel instance data of a given channel, each said latch being latched to a given processor processing said given channel and arranged such that only said given processor may change said latch to latch to a new processor.

13. The system of claim 12 wherein said associator further comprises a multiplexer mapping memory read/write requests from said given processor to instance channel data for said given channel in said shared memory.

14. The system of claim 13 wherein each of said plurality of processors is a digital signal processor ("DSP").

* * * * *